United States Patent [19]

Lai et al.

[11] Patent Number: 5,096,304

[45] Date of Patent: Mar. 17, 1992

[54] TEMPERATURE HISTORY INDICATOR

[75] Inventors: Joseph K. L. Lai, Kowloon; Brian J. Duggan, Hong Kong, both of Hong Kong

[73] Assignee: National Research Development Corporation, London, England

[21] Appl. No.: 567,374

[22] Filed: Aug. 15, 1990

[30] Foreign Application Priority Data

Aug. 17, 1989 [GB] United Kingdom ............... 8918774

[51] Int. Cl.[5] ............................................. G01K 7/38
[52] U.S. Cl. .................................. 374/176; 420/16; 420/17
[58] Field of Search .................... 374/176, 177, 163; 420/17, 16

[56] References Cited

U.S. PATENT DOCUMENTS

| 2,350,329 | 6/1944 | Hornfeck | 374/168 |
| 3,126,492 | 3/1964 | Swoboda | 374/176 |
| 3,969,109 | 7/1976 | Tanczyn | 420/40 |
| 4,533,259 | 8/1985 | Wakahara | 374/177 |
| 4,537,517 | 8/1985 | Inomata et al. | 374/176 |

FOREIGN PATENT DOCUMENTS

| 0138012 | 4/1985 | European Pat. Off. | |
| 0261345 | 3/1988 | European Pat. Off. | |
| 2430338 | 1/1976 | Fed. Rep. of Germany | 374/176 |
| 2545812 | 4/1976 | Fed. Rep. of Germany | 374/176 |
| 0034531 | 10/1971 | Japan | 374/176 |
| 0052921 | 4/1980 | Japan | 374/176 |
| 0134989 | 10/1980 | Japan | 374/176 |
| 0052536 | 3/1983 | Japan | 374/176 |
| 0095232 | 6/1983 | Japan | 374/176 |
| 1136034 | 1/1985 | U.S.S.R. | 374/176 |
| 1143832 | 2/1969 | United Kingdom | |
| 1143834 | 2/1969 | United Kingdom | |
| 2115835 | 9/1983 | United Kingdom | |
| 2133037 | 7/1984 | United Kingdom | |
| 2136017 | 9/1984 | United Kingdom | |
| 2203680 | 10/1988 | United Kingdom | |

OTHER PUBLICATIONS

"Templug" sales literature Shell Marketing Limited Industrial Division, London, England (No Date).
Kimmel, E., "Fusible Temperature-Indicating Materials", Electronic Packaging and Production, (Oct. 1980).
Kimmel, E., "Use of Temperature-Sensitive Materials for Process Control", Industrial Heating, (Mar. 1984).

Primary Examiner—William A. Cuchlinski, Jr.
Assistant Examiner—Diego F. F. Gutierrez
Attorney, Agent, or Firm—Cushman, Darby & Cushman

[57] ABSTRACT

A temperature history indicator for a boiler tube or other thing can take the form of a clip fixed around the tube or thing. The indicator is made of a ferrite-containing duplex stainless steel non-structural piece of alloy having approximately 63 weight % of iron, 23-27% chromium, 5-11% nickel, and the balance comprising other components no one of which exceeds 2.0%. Preferably, the balance of the alloy includes any one or more of 0.005-0.009% carbon, 0.3-0.8% silicon, 1.0-2.0% manganese, 0.002-0.006% phosphorous, 0.003-0.007% sulphur, 0-0.002% molybdenum, and 0.006% phosphorous, 0.003-0.007% sulphur, 0-0.02% molybdenum, and 0-0.02% copper. The thing is associated beforehand with the alloy in such a way as to irreversibly alter its magnetic properties and after exposure to temperature, the time and/or temperature are deduced by the loss in magnetic permeability.

6 Claims, 2 Drawing Sheets

TEMPERATURE HISTORY INDICATOR

BACKGROUND OF THE INVENTION

1. Field of the Invention

This invention relates to a temperature history indicator, that is, an indicator which undergoes a detectable change to an extent which is a function of temperature integrated over time.

2. Description of the Prior Art

Instantaneous temperature indicators are known, such as thermocouples, but although these are very accurate, it is complicated and expensive to use them to record the temperature history of a workpiece.

Peak temperature indicators are known, consisting for example of a crayon formulated to have a given melting point. When a workpiece marked with the crayon reaches this temperature, the mark at once melts, leaving an irreversible signal that the temperature was reached. Such an indicator is however unsuitable where transient temperature fluctuations are unimportant and it is required to determine a long-term average temperature, for example for lifetime assessment purposes for boiler components.

A temperature history indicator called "Templug" was developed by Shell Research Ltd. as a means of assessing temperatures in experimental internal combustion engines, where conventional methods of temperature measurement were impossible. The underlying physical principle depends on the fact that some metals and alloys undergo a permanent change in hardness if they are subjected to high temperatures. At a given temperature the amount of change in hardness will depend on the time of exposure. Conversely, if the time of exposure is known, measuring the hardness change can give an indication of the temperature at which it operated. The main advantages of using Templugs are versatility (they can be made into virtually any shape and size), durability (they have no fragile or delicate parts and are ideally suited to measure temperatures in extremely hostile environments), and cheapness.

However, even the Templug has some disadvantages. Thus, measurement of temperatures using Templugs involves taking hardness measurements on Templug samples. This often requires performing the measurement in a laboratory as portable hardness testers are less reliable.

The time required to perform one hardness measurement can be as long as one minute.

Hardness measurement is semi-destructive, in that once a measurement has been made it cannot be repeated over exactly the same spot.

SUMMARY OF THE INVENTION

According to the present invention, a thing subject to thermal stress has associated therewith a temperature history indicator being a non-structural piece of an alloy comprising 23-27 weight % chromium, 5-11% nickel, and at least 63% iron and a balance of other components no one of which exceeds 2.0 weight %. Preferably said balance comprises any one or more of: 0.005-0.02% carbon; 0.3-0.8% silicon; 1.0-2.0% manganese; 0.002-0.006% phosphorus; 0.003-0.007% sulphur; 0-0.02% molybdenum; and 0-0.02% copper.

The thing subject to thermal stress could be for example a turbine component or boiler component, and the non-structural piece may be a plug insert, plug, clip or insertable strip.

The advantages of using stainless steel are that it is corrosion resistant, tough, ductile and can be made into virtually any shape and size.

The invention further consists in a method of obtaining information about the temperature history of a thing, comprising associating it beforehand with a piece of a ferrite-containing duplex stainless steel transformable at high temperatures such as irreversibly to alter its magnetic properties, allowing the temperature history to unfold, thereafter measuring the magnetic properties deducing said information. Magnetic measurement is nondestructive and measurement can be made over and over again until a reproducible value is obtained. The steel should normally originally contain ferrite in a proportion of at least 5% at the start, and the ferrite is preferably transformable into carbides, intermetallic phases and austenite, this preferably being of the composition set forth above, and preferably having been previously cold worked (which speeds the transformation). Conveniently in the method, the change in magnetic properties is correlated with previously determined magnetic property changes on the same steel composition at known times and temperatures.

The ferrite content of a specimen may be measured using a commercially available instrument called the Feritscope. The principle of operation of this instrument is based on magnetic induction. Since ferrite is ferromagnetic while austenite is not, magnetic permeability is a direct measure of the ferrite content.

Each measurement is made by placing the probe perpendicularly and firmly onto the surface of the specimen (cleaned of surface oxide if necessary). The ferrite content in percentage terms is displayed. Several measurements are usually made and a mean value calculated.

The invention will now be described by way of example.

Six casts of duplex stainless steel with specially designed compositions were made in the form of 5 mm thick, 40 mm wide strips. Their chemical compositions are shown in Table 1. Casts A,C,E and B,D,F are two sets of alloys differing in carbon content and with increasing nickel content within each set.

| Chemical Composition of the Duplex Stainless Steels | | | | | | | | | |
|---|---|---|---|---|---|---|---|---|---|
| | Elements (% wt) | | | | | | | | |
| Cast | C | Si | Mn | P | S | Cr | Mo | Ni | Cu |
| A | 0.005 | 0.42 | 1.57 | 0.004 | 0.005 | 25.1 | <0.02 | 6.00 | <0.02 |
| B | 0.045 | 0.44 | 1.58 | 0.004 | 0.004 | 25.0 | <0.02 | 6.02 | <0.02 |
| C | 0.007 | 0.47 | 1.61 | 0.004 | 0.004 | 25.1 | <0.02 | 7.99 | <0.02 |
| D | 0.048 | 0.52 | 1.56 | 0.004 | 0.005 | 25.6 | <0.02 | 8.06 | <0.02 |
| E | 0.007 | 0.49 | 1.63 | 0.004 | 0.005 | 25.0 | <0.02 | 10.03 | <0.02 |
| F | 0.048 | 0.48 | 1.52 | 0.004 | 0.004 | 25.4 | <0.02 | 10.06 | <0.02 |

The following pretreatments were carried out:
(a) none (i.e. used as received-AR)
(b) solution treatment-ST (solution treated at 1000° C. for 1 hour followed by water quenching)
(c) Cold-rolled—(materials A,B,C,E were cold rolled by 50% and 85% (CR50 and CR85). The other two casts suffered cracking during rolling).

The ferrite content of these pretreated specimens was measured using a ferrite meter and then isothermally heat treated. Fast heating and cooling (water quench)

rates were adopted. The fraction of delta-ferrite transformed, X, was calculated from the equation $$X = (D_i - D_f)/D_i$$

where $D_i$ and $D_f$ are initial and final delta ferrite contents respectively.

The measurements made on each specimen are fairly reproducible and the relative standard deviation associated with 10 measurements is about 2%–7% for the ST (solution treated) specimens.

DESCRIPTION OF THE PREFERRED EMBODIMENTS

Figure 1:
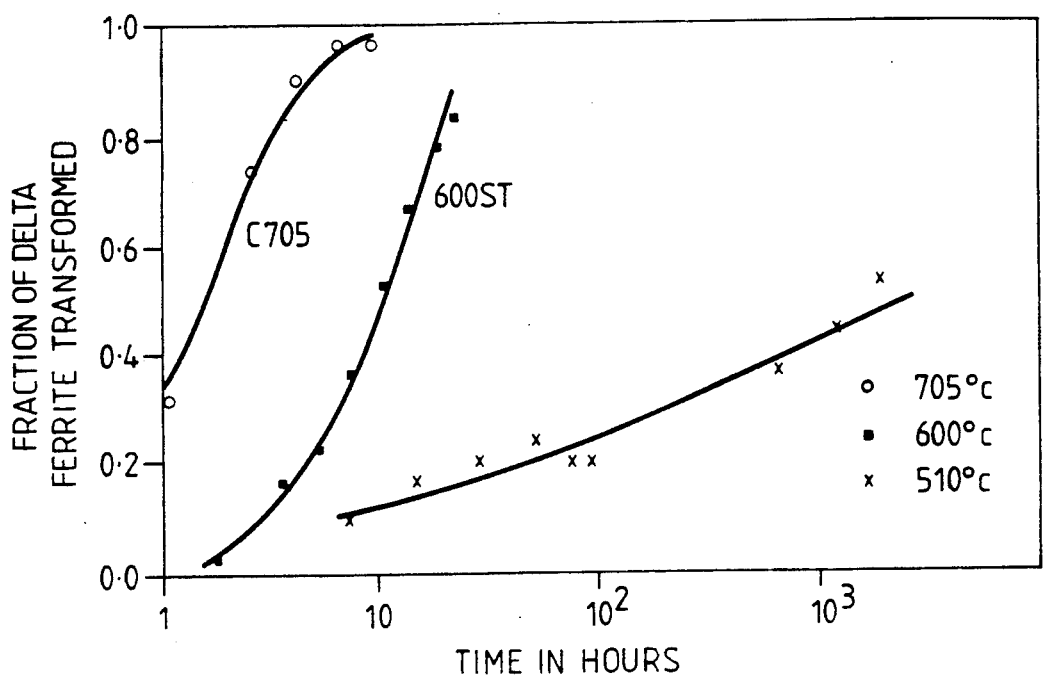
FIG. 1 shows time-temperature-transformation curves for specimen C in the ST condition at various temperatures, i.e. it shows transformation as a function of time.
Figure 2:
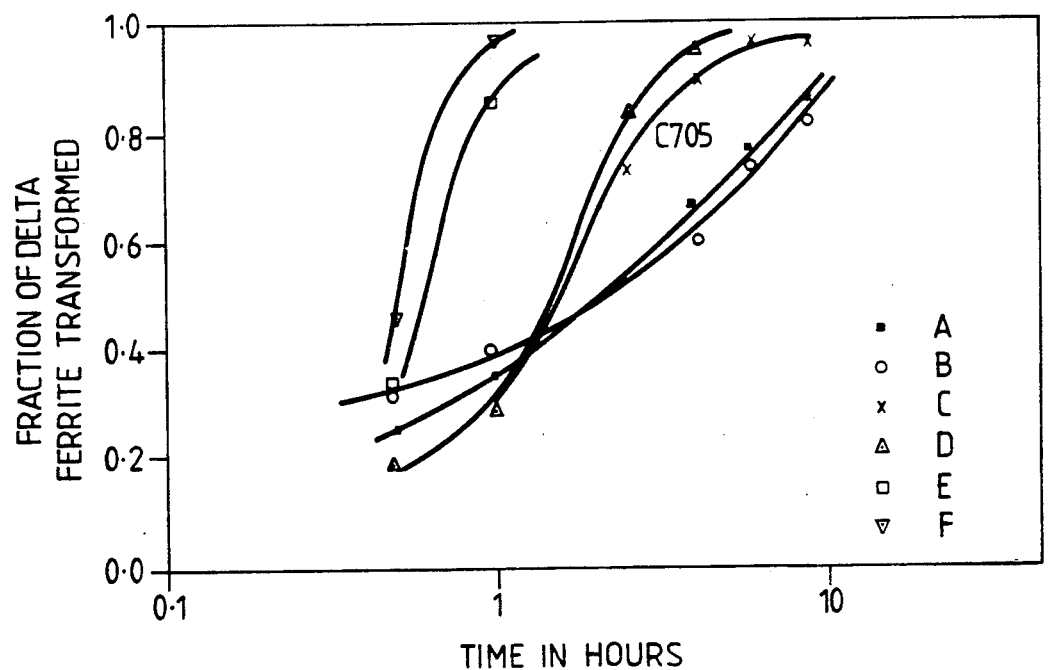
FIG. 2 shows transformation at 705° C. as a function of time for all six specimens in the ST condition.
Figure 3:
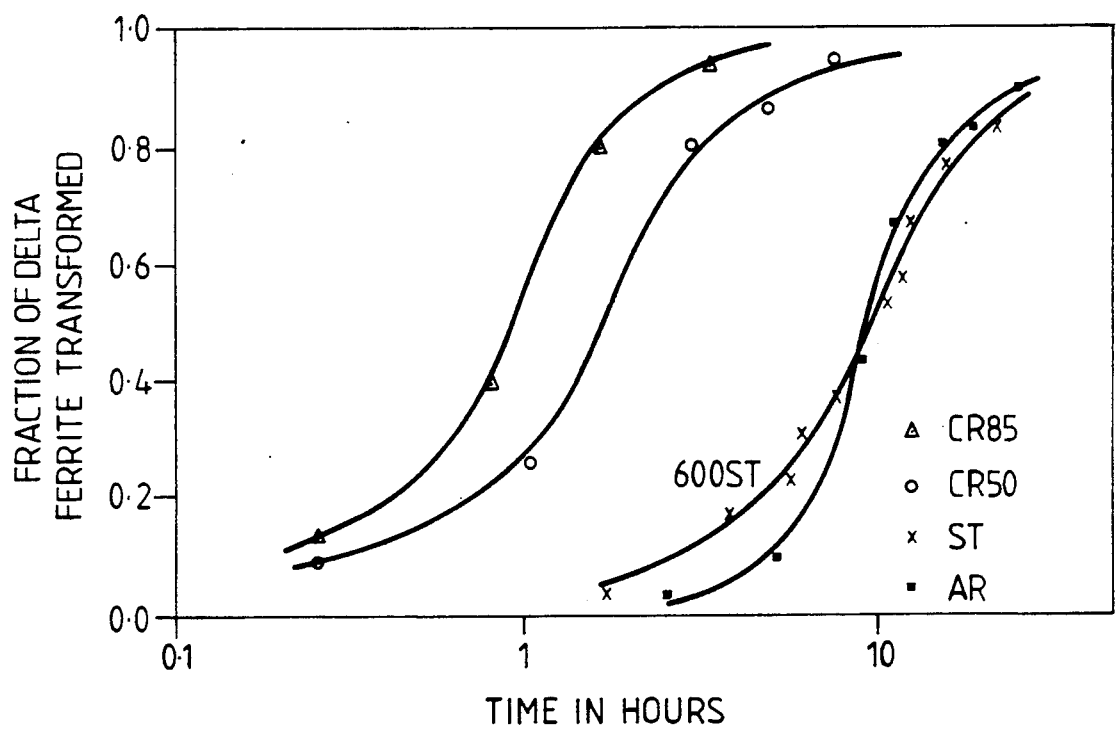
FIG. 3 shows transformation at 600° C. as a function of time for four specimens C—one each in the AR, ST, CR50 and CR85 conditions. Note that curve C705 is the same thing on FIGS. 1 and 2, and curve 600ST is the same thing on FIGS. 1 and 3.

FIG. 1 demonstrates that for composition C, the rate of transformation increases rapidly with temperature (510° C., 600° C. and 705° C.): From FIG. 2, it appears that the alloys having the same nickel content such as A and B; C and D; and E and F, have similar transformation curves, with the higher nickel alloys showing a faster rate of transformation. Higher carbon content generally seems to make the transformation slightly faster, especially in the case of cast F which has a higher carbon content than cast E. From FIG. 3, the solution heat treatment has little effect on transformation, while cold-rolling produces much faster transformation rates.

The results were checked using different samples from the same batches and were found to be reproducible under laboratory conditions:

Provided the time of exposure at temperature is known, the fractional change in delta-ferrite content monitored by the Feritscope can be related directly to temperature by means of the calibration curves, such as those in FIG. 1. The results obtained so far indicate that this technique of temperature measurement is quite reproducible under laboratory conditions. The different rates of transformation in the various alloys, once they have been characterised, render this technique suitable for a wide range of applications.

For practical applications, the stainless steel can be made into almost any shape. For example, it can be made into a screw-in or knock-in plug or plug insert fitting into a thermally stressed thing such as a turbine component or into jubilee clips which can be fastened onto a water boiler tube at various locations, or it can be in the form of a thin strip inserted into a fire tube boiler to indicate the steady axial temperature variation along the tube.

A further advantage is that the minimum size for accurate and reproducible measurement is only approximately 6 mm diameter by 2 mm thick. At this size many temperature indicators can be introduced into a system without large scale modifications being necessary.

The present temperature indicator is suitable for use in the temperature range 400° C. to 700° C.—the operating temperatures of power plant boiler headers and high pressure steam turbines. If gross overheating is suspected, e.g. by noticing the amount of oxidation on the material, a microstructural examination is necessary to supplement the result of magnetic measurement. In heavy section components the cooling rate is unlikely to be rapid enough to cause transformation to martensite, in other words, magnetic analysis is still likely to remain an accurate guide to % ferrite transformed. However, if rapid cooling is suspected, microstructural examination would be required.

We claim:

1. A method of obtaining information about the temperature history of a thing, comprising the steps of:
    associating a thing beforehand with a temperature history indicator being a non-structural piece of a duplex stainless steel alloy comprising 23–27 weight % chromium, 5–11% nickel, approximately 63% iron, and the balance comprising other components no one of which exceeds 2.0%,
    allowing the temperature to fluctuate in such a way as irreversibly to alter its magnetic properties, thereafter
    measuring the magnetic properties of said piece, and from the change in magnetic properties, deducing such information.

2. A method according to claim 1, wherein said indicator is transformable into carbides, intermetallic phases and austenite.

3. A method according to claim 1, wherein the change in magnetic properties is correlated with previously determined magnetic property changes on the same steel composition at known times and temperatures.

4. A method according to claim 1 wherein the balance of said alloy comprises any one or more of 0.005–0.009% carbon, 0.3–0.8% silicon, 1.0–2.0% manganese, 0.002–0.006% phosphorous, 0.003–0.007% sulphur, 0–0.02% molybdenum, and 0–0.02% copper.

5. A method according to claim 1 wherein the piece is a plug insert, plug, clip or insertable strip.

6. A method according to claim 1 wherein the thing is a turbine component or a boiler component.

* * * * *